United States Patent
Braithwaite et al.

(10) Patent No.: US 8,790,839 B2
(45) Date of Patent: Jul. 29, 2014

(54) HIGH TEMPERATURE FUEL CELL SYSTEM

(75) Inventors: Daniel Braithwaite, San Francisco, CA (US); Tibor Fabian, Mountain View, CA (US); Friedrich B. Prince, Woodside, CA (US)

(73) Assignee: Ardica Technologies, Inc., San Francisco, CA (US)

( * ) Notice: Subject to any disclaimer, the term of this patent is extended or adjusted under 35 U.S.C. 154(b) by 208 days.

(21) Appl. No.: 13/565,409

(22) Filed: Aug. 2, 2012

(65) Prior Publication Data

US 2013/0196243 A1 Aug. 1, 2013

Related U.S. Application Data

(60) Provisional application No. 61/514,417, filed on Aug. 2, 2011, provisional application No. 61/536,181, filed on Sep. 19, 2011.

(51) Int. Cl.
  *H01M 8/04* (2006.01)
(52) U.S. Cl.
  USPC ............................. 429/440; 429/423; 429/425
(58) Field of Classification Search
  None
  See application file for complete search history.

(56) References Cited

U.S. PATENT DOCUMENTS

| | | |
|---|---|---|
| 3,895,102 A | 7/1975 | Gallagher |
| 6,106,801 A | 8/2000 | Bogdanovic et al. |
| 6,461,752 B1 | 10/2002 | Leung |
| 6,534,950 B2 | 3/2003 | Leboe |
| 7,579,806 B2 | 8/2009 | Okuto |
| 8,118,893 B2 | 2/2012 | Rosenzweig et al. |
| 8,361,668 B2 | 1/2013 | Mclean et al. |
| 2001/0045364 A1 | 11/2001 | Hockaday et al. |
| 2002/0114985 A1 | 8/2002 | Shkolnik et al. |
| 2004/0219409 A1 | 11/2004 | Isogai |
| 2005/0058866 A1 | 3/2005 | Rocke et al. |
| 2005/0178061 A1 | 8/2005 | Tonca |
| 2006/0194082 A1 | 8/2006 | Tucker et al. |
| 2006/0275645 A1 | 12/2006 | Gallagher et al. |
| 2007/0031711 A1 | 2/2007 | Miyata et al. |
| 2007/0042244 A1 | 2/2007 | Spallone et al. |
| 2007/0160885 A1 * | 7/2007 | Lee et al. ........................ 429/26 |
| 2008/0172932 A1 | 7/2008 | Kelly et al. |
| 2008/0203816 A1 | 8/2008 | Fujita |
| 2011/0070509 A1 * | 3/2011 | Mai ............................... 429/415 |
| 2011/0159386 A1 | 6/2011 | Kaupert et al. |

* cited by examiner

*Primary Examiner* — Milton I Cano
*Assistant Examiner* — Carmen Lyles-Irving
(74) *Attorney, Agent, or Firm* — Jeffrey Schox; Diana Lin

(57) ABSTRACT

A fuel cell system for use with an endothermic fuel generator including a fuel cell stack having a primary fuel cell stack having a first thermal mass and a secondary fuel cell stack having a second thermal mass smaller than the first, the fuel cell system further including a first thermal coupling mechanism configured to thermally couple waste heat from the secondary fuel cell stack to the primary fuel cell stack, and a second thermal coupling mechanism configured to thermally couple waste heat from the fuel cell stack to the endothermic fuel generator.

4 Claims, 5 Drawing Sheets

HIGH TEMPERATURE FUEL CELL SYSTEM

CROSS-REFERENCE TO RELATED APPLICATIONS

This application claims the benefit of U.S. Provisional Application No. 61/514,417 filed 2 Aug. 2011 and U.S. Provisional Application No. 61/536,181 filed on 19 Sep. 2011, which are incorporated in their entirety by this reference.

TECHNICAL FIELD

This invention relates generally to the fuel cell field, and more specifically to a new and useful high temperature fuel cell system in the fuel cell field.

BACKGROUND

High temperature fuel cells are ideal for fuel cell applications, as they are highly efficient, have long-term stability, fuel flexibility, low emissions, and relatively low cost. However, these fuel cells emit waste heat, which must be managed. Furthermore, the high operating temperatures of these fuel cells lead to long start-up times, which prevent high temperature fuel cell stacks from being used in commercial applications. Thus, there is a need in the fuel cell field to create a new and useful high temperature fuel cell system that manages waste heat and achieves rapid start-up times.

DESCRIPTION OF THE PREFERRED VARIATIONS

The following description of the preferred variations of the invention is not intended to limit the invention to these preferred variations, but rather to enable any person skilled in the art to make and use this invention.

Figure 1:
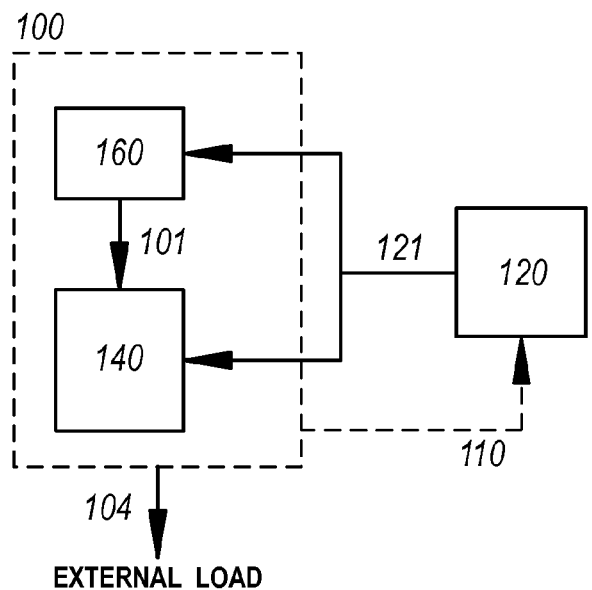
FIG. 1 is a schematic representation of the high temperature fuel cell system.
Figure 2:
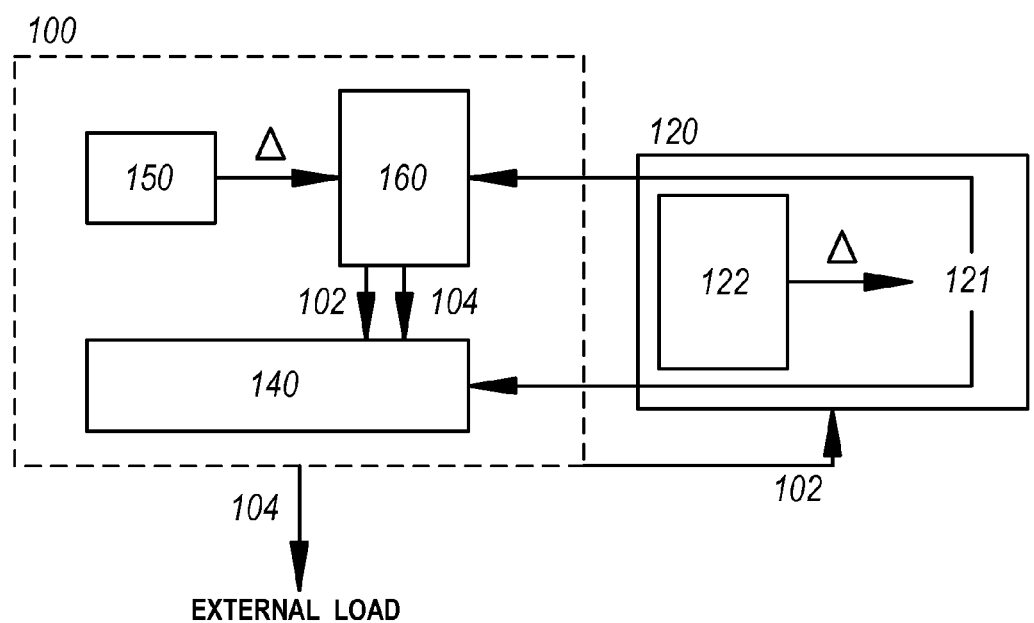
FIG. 2 is a schematic representation of a variation of the high temperature fuel cell system including a secondary fuel cell stack heating mechanism.

As shown in FIG. 1, the high temperature fuel cell system 100 includes a primary fuel cell stack 140 and a secondary fuel cell stack 160 configured to heat the primary fuel cell stack 140 with an fuel conversion product generated by the secondary fuel cell stack 160. The high temperature fuel cell system 100 is preferably used with a fuel source 120 that provides the fuel cell stack with fuel 121. The high temperature fuel cell system 100 functions to rapidly start the fuel cell stack in a kindling-like manner, wherein the smaller, secondary fuel cell stack 160 is used to heat the larger, primary fuel cell stack. During startup, the small secondary fuel cell stack 160 can be quickly heated due to its small thermal mass, and can quickly begin converting a small amount of fuel 121 to electricity. In doing so, the secondary fuel cell stack 160 produces waste heat, which maintains the secondary fuel cell stack temperature and can additionally be used to heat the primary fuel cell stack 140. The electricity produced by the secondary fuel cell stack 160 can additionally be used to heat the primary fuel cell stack 140. The fuel conversion products 101 (e.g. waste heat 102 and/or electricity 104) from the primary and secondary fuel cell stacks 140 and 160 can additionally be used to heat or generate fuel from the fuel source 120 (e.g. to heat/react a fuel precursor). By heating the primary fuel cell stack 140 with the fuel conversion products 101 from the secondary fuel cell stack 160, the fuel cell system 100 can have a faster start up time, due to the shorter amount of time required to heat the smaller mass of fuel cells in the secondary fuel cell stack 160 up to operational temperature, allowing the system to achieve the desired electrical output without having to wait for the larger primary fuel cell stack 140 to come to operational temperature. Furthermore, this fuel cell system 100 can require a lower startup energy input, as only a small secondary fuel cell stack 160 needs to be initially heated instead of the larger primary fuel cell stack 140. Pre-heating of the primary fuel cell stack 140 by the secondary fuel cell stack 160 allows less subsequent energy input to bring the primary fuel cell stack 140 up to operational temperatures. Additionally, the fuel cells of the primary fuel cell stack 140 and/or secondary fuel cell stack 160 can be high temperature fuel cells. Utilization of high temperature fuel cells can confer the benefit of lowering the system cooling requirements (e.g. lowering the cooling flow rate), which can result in less power 104 consumption, a smaller system profile, and/or a quieter cooling system. The fuel cell system 100 can also achieve higher energy densities than batteries, particularly when fuel storage compositions are utilized as the fuel source 120. The fuel cell system 100 is preferably used with an external load that requires electricity, such as a mobile device or another consumer application.

1. Fuel Source.

As shown in FIG. 1, the fuel cell system 100 is preferably utilized with a fuel source 120. The fuel source 120 utilized with the fuel cell system 100 functions to provide fuel 121 to the fuel cell system 100. The fuel source 120 is preferably a fuel generator that generates fuel 121, but can alternatively be a canister or storage container that directly stores the fuel 121. The fuel is preferably hydrogen gas, but can alternatively be any suitable fuel that can be converted by the fuel cell stack into electricity. The fuel generator preferably generates fuel from a fuel storage composition 122 (e.g. fuel precursor) that stores the fuel chemically. Fuel storage compositions are preferably used because they can have higher fuel densities than pure liquid or gaseous fuel 121. Alane, for example, has a higher energy density than liquid hydrogen. The fuel generator is preferably an endothermic fuel generator that generates fuel through an endothermic reaction. This can allow the waste heat of the fuel cell stack(s) 140 and 160 to be used to maintain the fuel-generating reaction of the fuel storage composition during steady state operation and/or startup. The fuel generator preferably thermolyses the fuel storage composition to generate fuel, but can alternatively react the fuel storage composition with a second reagent (e.g. an acid, base, or any other suitable reagent), combust the fuel storage composition (e.g. wherein the fuel generator is a reformer), or otherwise process the fuel storage composition to generate fuel. However, the fuel generator can alternatively be an exothermic fuel generator. The fuel source 120 is preferably an insert removably couplable to the fuel cell system 100, wherein the fuel source 120 can be clipped, adhered, inserted into, or coupled over the fuel cell system 100, but can alternatively be rigidly coupled to the fuel cell system 100. Alternatively, the fuel source 120 can be statically coupled to the fuel cell system 100, wherein the fuel storage composition can be removably coupled to the fuel source 120 (e.g. inserted into the fuel source 120. The fuel source 120 can include a series of insulated compartments containing a packed powder of fuel storage composition, a block of fuel storage composition, a solid sheet of fuel storage composition, a series of insulated compartments that contain solid segments, liquid, gas, or any other suitable form or configuration of fuel storage composition.

The fuel storage composition 122 of the fuel generator preferably functions to store and produce fuel suitable for the fuel cell stack. The fuel storage composition preferably binds (e.g. adsorbs) the fuel by ionically or metallically binding the fuel, but can alternatively covalently bind the fuel. The fuel storage composition preferably decomposes thermolytically into fuel 121 (e.g. hydrogen), wherein fuel generation is preferably endothermic. Endothermic reactions are preferred because they prevent fuel generation runaway (when a small amount of fuel generation creates enough heat to initiate further fuel generation), and allow for rapid fuel generation cessation. The fuel storage composition can alternatively generate fuel 121 through reaction with a liquid, gaseous, or solid reagent, wherein the reaction can be endothermic or exothermic. The fuel storage composition is preferably a solid, but can alternatively be liquid, a slurry, or a gas. The fuel storage composition is preferably a metal hydride, more preferably alane ($AlH_3$), such as the a-polymorph of alane, alternatively any suitable polymorph of alane, but can alternatively be aluminum lithium hydride ("LAH", $LiAlH_4$), sodium borohydride ("SBH", $NaBH_4$), or any other suitable metal hydride. Alternatively, the fuel storage composition can be any other suitable fuel storage composition, such as light hydrocarbon fuels (e.g. methane, propane, butane, etc.), heavy hydrocarbon fuels (e.g. gasoline, diesel, or jet fuel), or any other suitable fuel storage composition.

Figure 3A:
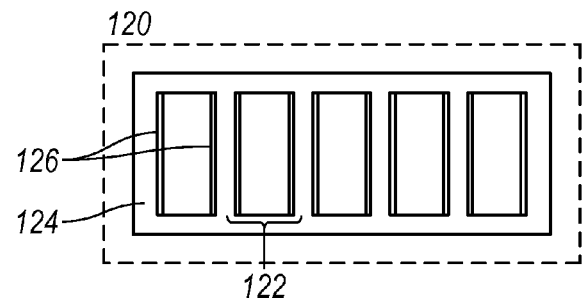
FIGS. 3A and 3B are schematic representations of a first and second variation of the fuel source.

In a first variation, the fuel source 120 includes an endothermic fuel generator, wherein the endothermic fuel generator includes a block of fuel storage composition and a heater element 126. The fuel storage composition is preferably a metal hydride, more preferably a metal hydride that thermolyses to endothermically produce hydrogen gas, such as alane. In one alternative, as shown in FIG. 3A, the fuel source 120 can be compartmentalized into insulated reaction segments to better control fuel generation. This segmentation allows control over the quantity and location of fuel generation, and enables faster and more efficient fuel generation, as heat loss to the rest of the fuel source 120 is minimized and only a small section of fuel storage composition is being heated. This can be particularly desirable when an endothermic fuel storage composition is used, as the thermal insulation 124 allows the fuel storage composition to be maintained at a reactive temperature. Each reaction segment can additionally include a heater element 126 (e.g. wire mesh) disposed between the insulation 124 and the fuel storage composition that conducts or generates heat to heat the reaction segment. Alternatively, the fuel source 120 can include a singular block of fuel storage composition with heater elements 126 located on one or both ends.

In this first variation, heat for the endothermic fuel generation reaction is preferably the waste heat from the fuel cell stack(s), but can additionally and/or alternatively be heat provided by a heating mechanism, an exothermic fuel generation reaction, an exothermic reaction (e.g. catalytic combustion, etc.), or heat provided by any other suitable heat source. One or more of the aforementioned heat sources can be used sequentially or simultaneously to heat the endothermic fuel generator throughout fuel cell system operation. For example, heat from a heating mechanism can be used during system startup, while waste heat from the fuel cell stack(s) can be used during steady state operation. Heat from the heat source is preferably provided to fuel storage composition through the heater element 126, but can alternatively be provided through direct thermal contact with the exterior surface of the fuel storage composition, through indirect thermal contact (e.g. through a substantially thermally insulated volume encapsulating the fuel storage composition), or by any other suitable means.

Figure 3B:
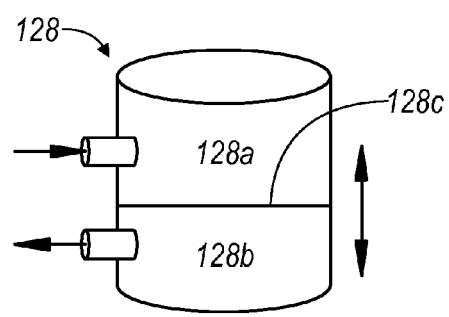

In a second variation of the fuel source 120, as shown in FIG. 3B, the fuel source 120 can be a fixed volume enclosure 128 containing a waste compartment 128a separated from a fuel compartment 128b by a movable membrane 128c, wherein the fuel compartment 128b exchanges volumes with the waste compartment 128a during operation. In this variation, fuel 121 is preferably pumped out of the fuel compartment 128b into the fuel cell system 100, and the waste products of the fuel 121 are pumped from the fuel cell system 100 back into the waste compartment 128a. In one alternative, the fuel compartment 128b can additionally include a fuel storage composition and a reagent reservoir containing a fluid reagent, wherein combination of the reagent with the fuel storage composition can produce fuel. For example, the fuel storage combination can be SBH, and the reagent can be water or acid. The fuel source 120 can additionally include a pumping mechanism, such as a positive displacement pump (e.g. diaphragm pump, peristaltic pump, etc.), that pumps the reagent to a reaction front proximal the fuel storage composition 122. The fuel source 120 can additionally include a processor that controls the rate of fuel generation by controlling the pumping rate.

Figure 5A:
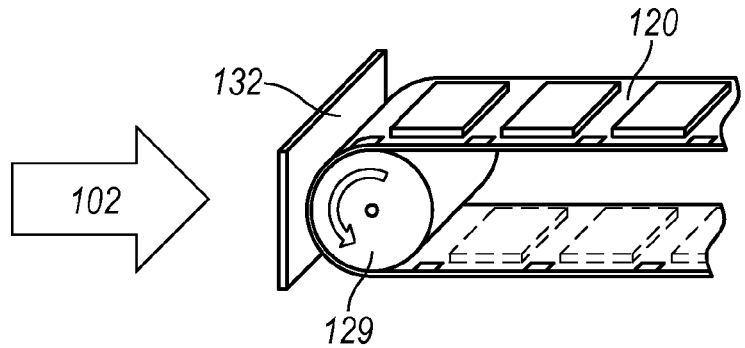
FIGS. 5A and 5B are schematic representations of a first and second variation of the biasing mechanism.

In this second variation, the fuel cell system 100 can additionally include a waste removal mechanism that functions to remove waste products from the fuel generation process. More specifically, the waste removal mechanism removes waste products from the reaction zone, where the fuel storage composition contacts the reagent (e.g. liquid reagent, heat). The waste removal mechanism is preferably passive, but can alternatively be active. The waste removal mechanism can additionally include a waste container that stores the waste products. The waste container is preferably located within the fuel source 120, but can alternatively be located anywhere within the casing 110. In a first variation, as shown in FIG. 5A, the waste removal mechanism is a ratcheting roller 129 that removes a used compartment of fuel storage composition from the heating zone. In a second variation, the pressure from generated fuel 121 clears the waste products from the reaction zone. In a third variation, the pressure from the biasing mechanism (e.g. an elastic bag enclosing the fuel storage composition or a spring compressed against the fuel storage composition) forces the waste products away from the reaction zone. In a fourth variation, a motor drives a scraper that removes the waste product from the reaction interface.

The fuel source 120 can alternatively be a reforming module that functions to reform the fuel 121 to be compatible with the fuel cell. This module is particularly relevant when using heavier hydrocarbons as fuel 121. The reforming module preferably reforms the fuel 121 by mixing the fuel 121 with hydrogen, carbon monoxide, carbon dioxide, steam, and a lighter hydrocarbon (e.g. methane), or by reacting the fuel 121 with air or steam prior to fuel cell ingress. The reforming module preferably utilizes the waste water and heat from the fuel cell oxidization process to create the steam required in the reformation processes.

2. Fuel Cell System.

The fuel cell system 100 functions to convert fuel into electricity. As shown in FIG. 1, the fuel cell system includes a primary fuel cell stack 140 and a secondary fuel cell stack 160, wherein the secondary fuel cell stack 160 heats the primary fuel cell stack 140 with fuel conversion products 101, such as waste heat 102 and power 104. The fuel cell system additionally includes a first thermal coupling mechanism configured to thermally couple waste heat 102 from the secondary fuel cell stack to the primary fuel cell stack. The fuel cell system 100 can additionally includes a primary fuel cell stack heating element that heats the primary fuel cell stack 140 with power 104 from the secondary fuel cell stack 160. The fuel cell system additionally includes a second thermal coupling mechanism 132 configured to thermally couple waste heat 102 from the primary fuel cell stack 140 and/or secondary fuel cell stack 160 to the fuel source 120.

As shown in FIG. 1, the primary fuel cell stack (PFCS) 140 of the fuel cell system 100 functions to convert fuel 121 into electricity 104. The PFCS 140 preferably generates waste heat during fuel conversion, wherein the waste heat maintains the operational temperature of the PFCS 140. One or more fuel conversion products 101 (e.g. waste heat, generated electricity, etc.) of the PFCS 140 can additionally be used to heat and thermolyse the fuel storage composition to produce fuel. The PFCS 140 preferably has a higher power output capability than that of the secondary fuel cell stack (SFCS), and preferably has a thermal mass higher than that of the SFCS, requiring a higher thermal load than the SFCS to reach operational temperatures. The PFCS 140 preferably includes a plurality of fuel cells 142 fluidly coupled in parallel, but can alternatively include a plurality of fuel cells 142 in series. The PFCS 140 preferably includes a plurality of fuel cells 142 electrically coupled in series, but can alternatively include a plurality of fuel cells 142 electrically coupled in parallel. The fuel cells 142 of the PFCS 140 preferably have high operating temperatures. The fuel cells 142 are preferably Polybenzimidazole (PBI) type, but can alternatively be Nafion type, solid oxide fuel cells (SOFC), molten carbonate fuel cells (MCFCs), alkaline fuel cells, direct methanol fuel cells, phosphoric acid fuel cells, or any suitable fuel cell made of any suitable material.

As shown in FIG. 1, the secondary fuel cell stack (SFCS) 160 functions to convert fuel 121 to electricity, as well as to heat the primary fuel cell stack 140. The SFCS 160 preferably generates waste heat during the fuel conversion process, wherein the waste heat is preferably used to maintain the SFCS operating temperature. The SFCS 160 preferably heats or pre-heats the PFCS 140 with one or more fuel conversion products 101 of the SFCS 160, such as waste heat and/or generated electricity. The fuel conversion products 101 of the SFCS 160 can additionally be used to heat an endothermic fuel source. The SFCS 160 is preferably operational during fuel cell system startup, and can be operational in an operational state, partially operational state, or non-operational state after PFCS energy generation has begun. The SFCS 160 preferably has a thermal mass lower than that of the PFCS 140, requiring a smaller thermal load than the PFCS to reach operational temperatures. This can allow the SFCS 160 to reach operational conditions faster than the PFCS 140, such that power 104 can be provided faster than if only a PFCS 140 were used. The SFCS can have a lower power output capability than that of the PFCS 140, but can alternatively have a similar or higher power output capability than that of the PFCS 140. The SFCS 160 is preferably a fuel cell stack having fewer fuel cells than the PFCS 140 (e.g. 1 fuel cell), but can alternatively be a fuel cell stack that is physically smaller than the PFCS 140 (e.g. the fuel cells have a smaller active area), be a low temperature fuel cell stack, or be any other suitable fuel cell stack with a lower thermal mass than the PFCS 140. The SFCS 160 preferably includes one or more fuel cells fluidly coupled in parallel, but can alternatively include one or more fuel cells fluidly coupled in series. The fuel cells of the SFCS 160 are preferably electrically coupled in series, but can alternatively be electrically connected in parallel. The fuel cells of the SFCS 160 are preferably the same fuel cell type as the PFCS 140, but can alternatively be different fuel cell types, and can include one or more types of high temperature fuel cells, intermediate temperature fuel cells, or low temperature fuel cells (e.g. PEM fuel cells). The SFCS 160 and PFCS 140 preferably form a continuous fuel cell stack, but can alternatively form a segmented fuel cell stack. The SFCS 160 is preferably a portion of the PFCS 140, and is preferably an interior sub-stack of the PFCS 140, more preferably a central sub-stack of the PFCS 140, but can alternatively be a sub-stack of cells on the anode or cathode end of the PFCS 140. The SFCS 160 can alternatively be a separate fuel cell stack. In the case where the SFCS 160 is a portion of the PFCS 140, it is preferable to create a temperature gradient within the stack either by rapid heating, thermal insulation, or thermal regulation (e.g. with a heat pump/Peltier element), such that the SFCS portion 160 of the stack heats up first to the operating temperature and provides its waste heat to the PFCS 140 to eventually bring the entire stack up to the operating temperature in a bootstrap fashion. The temperature gradient can be formed by one or more heating elements adjacent the SFCS end fuel cells, heating elements interdigitated between the SFCS fuel cells, or by any other suitable heating elements.

The SFCS 160 is preferably heated by a heating mechanism 150. The heating mechanism 150 is preferably a battery, but can alternatively be a catalytic heater that combusts hydrogen or any suitable heating mechanism 150. Alternatively, the heating mechanism 150 can be the fuel source, wherein the fuel generated by the fuel source 120 can be hot enough to heat or pre-heat the SFCS 160. However, any suitable heating mechanism or combination thereof can be used. The battery of the heating module 150 preferably resistively heats the SFCS 160 (e.g. through one or more heating elements, such as wires, contacting the SFCS), and can additionally function as a load on the primary and/or secondary fuel cell stack 160 to absorb excess electricity produced by the primary and/or secondary fuel cell stack 160, and/or as an adjustable load on the primary and/or secondary fuel cell stack 160 to control fuel cell stack purging. The battery is preferably rechargeable, and preferably has an adjustable resistance. The battery is also preferably electrically coupled to the electrical outlet of the PFCS 140 and/or the SFCS 160. This allows the battery to absorb excess electricity produced after the external load is decoupled from the fuel cell system 100 and before fuel production is ceased. Furthermore, the battery can also function as an adjustable load to control the fuel cell purging, as described in U.S. application Ser. No. 12/322,337 filed 29 Jan. 2009 (which is hereby incorporated in its entirety by this reference), wherein the battery load is decreased to increase the internal pressure of the fuel cell stack, which results in a purge. The battery is preferably a lithium ion polymer battery, but can alternatively be lithium ion, nickel metal hydride, nickel cadmium, or any suitable battery. The heating mechanism 150 is preferably thermally coupled, more preferably directly coupled, to the SFCS 160. For example, the resistive heating elements of the battery 152 are preferably interdigitated within the SFCS 160 such that, in use, the resistive heating elements of the battery preferably rapidly heat the fuel cells of the SFCS 160 to the operational temperature.

Figure 7:
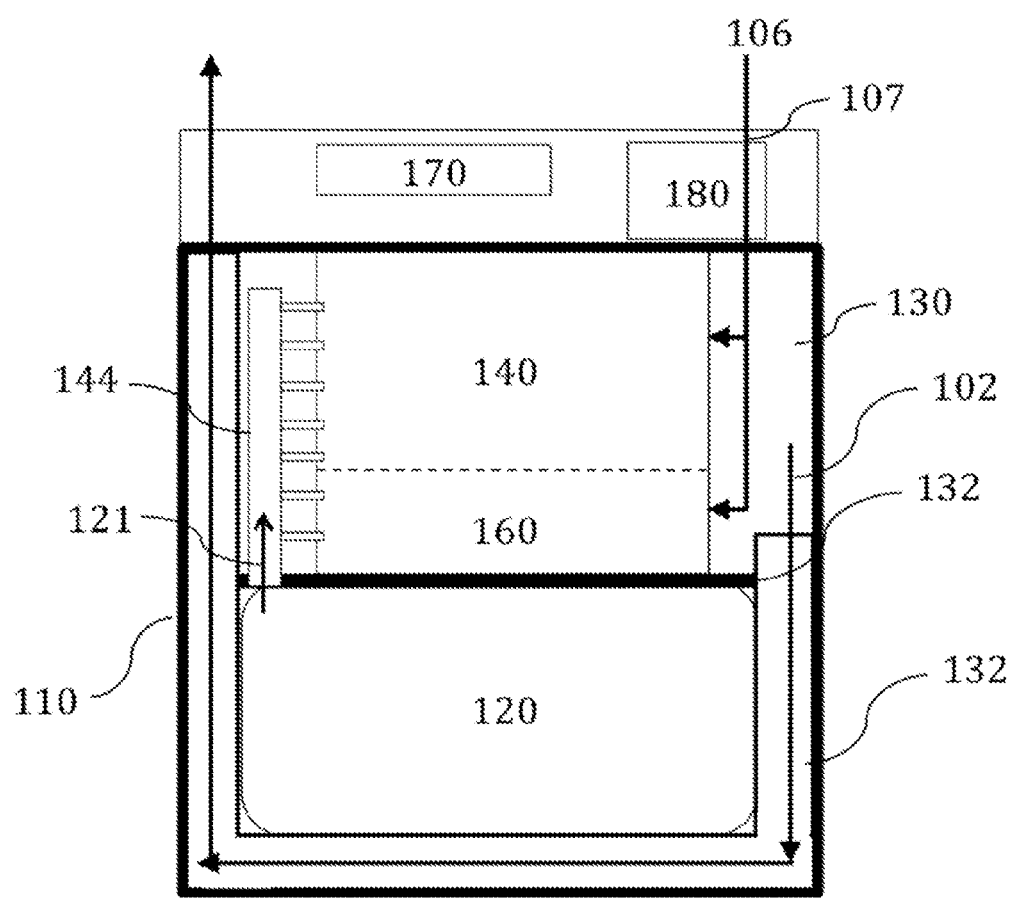
FIG. 7 is a side view of a variation of the fuel cell system.

The fuel cell system 100 preferably additionally includes a first thermal coupling mechanism 130 that functions to thermally couple the waste heat 102 from the SFCS 160 to the PFCS 140. The first thermal coupling mechanism 130 can facilitate waste heat transfer to the PFCS 140 directly from the SFCS fuel cells, from the SFCS exhaust stream, from the cooling fluid after SFCS cooling, or from any other suitable heat-containing portion or product of the SFCS 160. Waste heat 102 can be transferred through conduction, convection, and/or radiation. In one variation, the SFCS 160 is physically connected to the PFCS 140, and waste heat is directly transferred from the SFCS 160 to the PFCS 140 through conduction and/or radiation. For example, the first thermal coupling mechanism 130 can be the fuel cell stack itself, wherein the SFCS 160 is a sub-stack of the PFCS 140. In another variation, as shown in FIG. 7, the first thermal coupling mechanism 130 includes a substantially thermally insulated volume that encapsulates both the SFCS 160 and PFCS 140, such that heat can be transferred by radiation, conduction, and/or convection. The thermally insulated volume can be defined by a portion of a thermally insulated casing or by any other suitable means. In another variation, the first thermal coupling mechanism 130 includes a fluid flow path that facilitates heated fluid flow from the SFCS 160 over and/or through the PFCS 140. The flow path can be defined by a common volume encapsulating both the SFCS 160 and the PFCS 140, by one or more fluid manifolds, or by any other suitable mechanism. In a first example, the PFCS 140 is located downstream from the SFCS 160 in the cooling fluid flow path. In a second example, anode and/or cathode exhaust is passed from the SFCS 160 over and/or through the PFCS 140. The SFCS 160 anode and/or cathode exhaust can be fed into the anode and/or cathode of the PFCS 140 as fuel and/or process air, respectively, or can be passed over the exterior of the PFCS 140. The fluid flow path can be redirected once the PFCS has reached operational temperatures (e.g. by a valve). In another variation, the first thermal coupling mechanism includes a fluid flow path thermally coupled to, but fluidly isolated from, the PFCS 140. This fluid flow path preferably includes a thermally conductive manifold that receives SFCS 160 exhaust, cooling fluid, or any other suitable flow off the SFCS 160 containing waste heat. The thermally conductive manifold can be a cooling fluid manifold, a cathode and/or anode exhaust manifold, or any other suitable manifold. In one example, the thermally conductive manifold traverses about a radial portion of the PFCS 140. The thermally conductive manifold can additionally include conductive elements such as fins, wires, or any other conductive element that increase the area of thermal connection between the PFCS 140 and the thermally conductive manifold (e.g. wherein the conductive elements are interdigitated between the fuel cells of the PFCS 140). However, any suitable thermal coupling mechanism or combination thereof can be used to transfer waste heat from the SFCS 160 to the PFCS 140.

The fuel cell system 100 can additionally include a PFCS heating element, which functions to heat the PFCS 140 with power 104 generated by the SFCS 160. The power output of the SFCS 160 can be electrically connected to the PFCS heating element, wherein the PFCS heating element heats the PFCS 140 with all or a portion of the generated electricity. All or a portion of the power 104 produced by the SFCS 160 can be provided to the PFCS heating element. The PFCS heating element is preferably a resistive heater with a constant or adjustable resistivity that is thermally coupled to, more preferably physically coupled to, the PFCS 140 (e.g. interdigitated between adjacent fuel cells). However, the PFCS heating element can be an inductive heater, a reaction initiator (e.g. a spark generator), or any other suitable heating element.

The fuel cell system 100 preferably additionally includes a fuel source heating mechanism that functions to provide heat to the fuel source 120. The fuel source heating mechanism is preferably a second thermal coupling mechanism, or thermal interface 132, that functions to thermally couple waste heat from the PFCS 140 and/or SFCS 160 to the fuel source 120. However, the fuel source heating mechanism can be a heating element that heats the fuel source 120 with heat generated from power, heat generated from a chemical reaction, or any other suitable heat source. The thermal interface 132 is preferably made of thermally conductive materials, such as metal (e.g. copper, gold, nickel, etc.), wherein heat is transferred through the container. The thermal interface 132 is preferably thermally connected to the heater elements 126. The thermal interface 132 is preferably passive, but can alternatively be active. The thermal interface can facilitate heat transfer to the fuel storage composition from the fuel cell stack(s), the exhaust from the fuel cell stack(s), or the cooling fluid passing over the fuel cell stack(s).

Figure 6A:
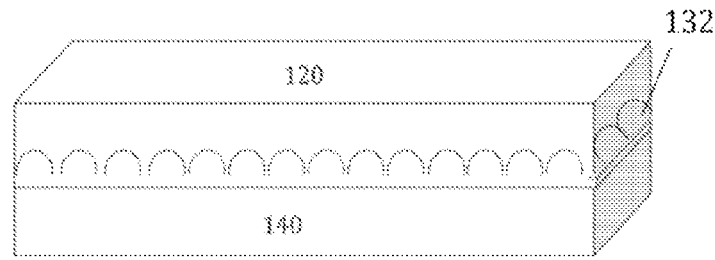
FIGS. 6A and 6B are schematic representations of a second and third variation of the thermal interface.

In one variation, as shown in FIG. 7, the thermal interface 132 includes a thermally conductive, fluid impermeable divider substantially fluidly isolating the fuel source 120 from the fuel cell stack(s). The thermally conductive divider preferably includes a fuel manifold 144 extending therethrough that fluidly couples the fuel source 120 to the anodes of the fuel cells. The thermally conductive divider can form a fluid impermeable seal with the walls of a container encapsulating the fuel source 120, and can additionally be statically coupled to the fuel cell stack(s). The thermally conductive divider preferably directly thermally contacts the fuel source 120, more preferably the fuel storage composition, but can alternatively conduct heat into a substantially thermally insulated volume containing the fuel storage composition. The thermally conductive divider can additionally be decoupled from the fuel storage composition by an active or passive mechanism. For example, the thermally conductive divider can include a magnetic control element operable in a first mode, wherein a magnetic attractive force disposes the thermally conductive divider towards the fuel storage composition while the fuel pressure within the fuel source 120 is below a threshold pressure, and a second mode, wherein the fuel pressure overcomes the attractive force and pushes the thermally conductive divider away from the fuel storage composition. Alternatively, the thermally conductive divider can be a volume filled with a heat transfer medium (e.g. hydrogen), wherein removal of the heat transfer medium substantially decouples the fuel storage composition from the fuel cell stack(s). However, any other suitable thermal or physical decoupling mechanism can be used. The thermal interface 132 is preferably a substantially smooth and planar interface, but can alternatively be a corrugated or grooved interface, as shown in FIG. 6A, wherein the fuel source 120 includes a complimentary interface, such that the fuel source 120 can be inserted into direct thermal contact with the fuel cell stacks (PFCS and/or SFCS). However, the thermal interface 132 can have any other suitable configuration.

Figure 6B:
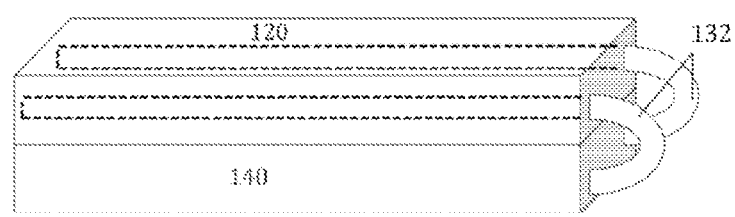

In another variation, as shown in FIG. 7, the thermal interface 132 includes a thermally conductive flow path from the PFCS 140 and/or the SFCS 160 that fluidly isolates but thermally couples waste heat from the PFCS/SFCS exhaust and/or cooling fluid with the fuel source 120. The flow path can be entirely or partially fluidly continuous with the first thermal coupling mechanism 130, or can be fluidly isolated from the first thermal coupling mechanism 130. The flow path preferably traverses along a substantial portion of the fuel source 120. The flow path can traverse along the fuel source exterior, interior, or along any other suitable portion of the fuel source. The flow path can include a sleeve enclosing the fuel source 120 (as shown in FIG. 7), one or more heat pipes winding about a radial portion of the fuel source 120, one or more heat pipes extending through the interior of the fuel source 120 (as shown in FIG. 6B), or any other suitable flow path configured to transfer heat between the exhaust and the fuel source 120. Heat conduction through the flow path is preferably passively controlled, wherein heat preferably flows from the higher temperature exhaust to the lower temperature fuel source 120, but heat conduction can alternatively be actively controlled by a bi-metal temperature switch, a valve, a heat pump, any other suitable heat conduction control mechanism.

In another variation, the thermal interface 132 includes a thermally insulated volume encapsulating the fuel source 120 and PFCS 140 and/or SFCS 160.

In another variation, the thermal interface 132 is a fluid, preferably inert to the fuel storage composition, that is placed in thermal contact with the fuel storage composition and the fuel cell stack(s), wherein the fluid transfers heat from the fuel cell stack(s) to the fuel storage composition.

In another variation, the thermal interface 132 includes a heat pump (e.g. a Peltier element) that regulates heat flow between the fuel cell stack(s) and the fuel source 120, wherein the heat pump can further function to regulate the fuel cell stack(s) temperatures and/or to control the rate of fuel generation by controlling the amount of heat provided to the fuel storage composition.

In another variation, the thermal interface 132 includes a heating zone (preferably fed by heat from the PFCS), wherein a feed mechanism moves a segment of fuel storage composition into thermal contact with the heating zone. The heating zone is preferably heated by heat pipes running from the fuel cell stack(s) (PFCS and/or SFCS), but can alternatively be heated by any suitable means. As shown in FIG. 5A, the feed mechanism can be a ratcheting roller 129 that advances a fuel storage compartment containing a quantity of fuel storage composition 122 into thermal contact with the heating zone. However, an auger feed, a pneumatic feed, a pressurized mechanism, or any other suitable feed mechanism can be utilized to move segments of fuel storage composition into contact with the heating zone. The generated fuel, exhaust air from the fuel cell stacks, or purge stream from the fuel cell stacks can also be utilized to move fuel storage composition segments into contact with the heating zone. Alternatively, the fuel storage composition can be pre-processed prior to contact with the heating zone (e.g. made into a slurry), wherein the processed fuel storage composition is more easily transferred and/or reacted (e.g. the slurry can be pumped into contact with the heating zone).

The fuel source heating mechanism can additionally include a heating mechanism that heats the fuel source 120 with electric power. The heating mechanism is preferably used to heat the fuel source 120 during system startup, but can additionally and/or alternatively provide heat to the fuel source 120 during system steady state operation. The fuel source heating mechanism is preferably thermally connected to the heating elements 126. The fuel source heating mechanism is preferably electrically connected to a power source, more preferably the PFCS 140 but alternatively the SFCS 160, a battery, or any other suitable power source. The fuel source heating mechanism is preferably a resistive heater (e.g. a wire, wire mesh, etc.) with a constant or adjustable resistivity, but can alternatively be an inductive heater, a thermally coupled exothermic reaction (e.g. catalytic combustion), or any other suitable heater element 126. The fuel source heating mechanism can be the same as that used to heat the SFCS 160, but can alternatively be a different heating mechanism.

The fuel source heating mechanism can alternatively be a secondary exothermic fuel generator that functions to at least partially heat the primary endothermic fuel generator while providing an initial quantity of fuel. The fuel cell system 100 preferably includes a thermal connection between the primary and secondary fuel generators. The primary fuel generator preferably initially stores substantially more fuel than the secondary fuel generator. Both the primary and secondary fuel generator preferably include metal hydrides, but can alternatively include other fuel storage compositions. The fuel generation initiation rate of the secondary fuel generator is preferably faster than that of the primary fuel generator, but can alternatively be similar or slower. The secondary fuel generator is preferably used during system startup, and is preferably non-operational during steady state system operation. The secondary fuel generator can be substantially thermally decoupled from the fuel source 120 or fuel cell system 100 after system startup, or can simply be shut off after system startup. Fuel generation from the secondary fuel generator is preferably ceased when a stop condition, such as a time threshold, temperature threshold, or pressure threshold, is reached. Secondary fuel generator operation is preferably actively controlled by the processor, but can alternatively be passively controlled (e.g. wherein the temperature of the secondary fuel generator rises past a reaction-favorable temperature). The thermal connection preferably enables the primary fuel generator to be heated with the waste heat from the secondary fuel generator. The thermal connection can be a fuel flow path between the secondary fuel generator and the SFCS 160 and/or PFCS 140, wherein the primary fuel generator is located within the fuel flow path, such that hot fuel must flow over and/or through the primary fuel generator to reach the fuel cell stack. Alternatively, the thermal connection can alternatively be a fuel manifold, thermally coupled to but fluidly isolated from the primary fuel generator, or any other suitable thermal connection that thermally couples the waste heat of the secondary fuel generator with the primary fuel generator. In one variation, the primary fuel generator includes a substantially continuous or segmented block of alane, while the secondary fuel generator includes a block of compressed SBH powder and a volume of liquid reagent. In operation, a processor initiates liquid reagent pumping to the SBH, initiating exothermic production of hydrogen gas. The hot hydrogen gas preferably flows past the alane within the primary fuel generator to heat the alane. However, any suitable primary and secondary fuel generator can be used. The exothermic fuel generator can be utilized independently or in conjunction with other heat sources, particularly when the waste heat from the secondary fuel generator cannot provide adequate heat to initiate fuel generation within the primary fuel generator. For example, a fuel source heating mechanism, similar to that described above, can provide additional heat simultaneously with waste heat provision or after a start condition, such as a time threshold, temperature threshold, or pressure threshold, has been reached.

Figure 4:
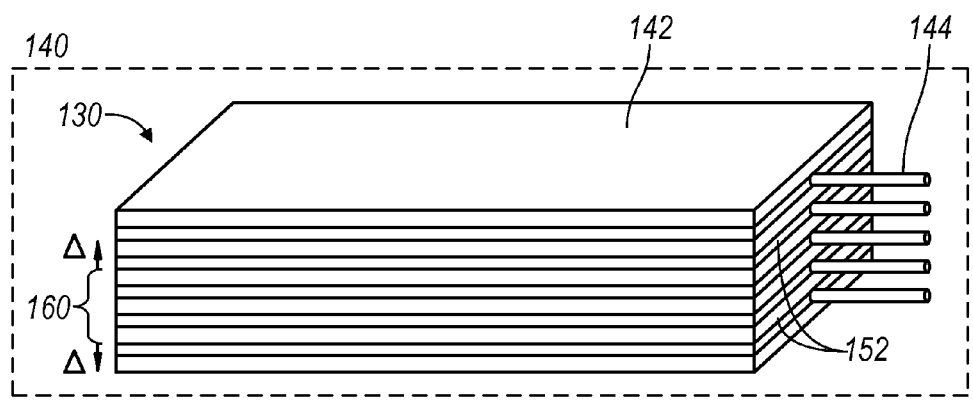
FIG. 4 is a schematic representation of a variation of the primary fuel cell stack with a variation of the fuel interface.
Figure 5B:
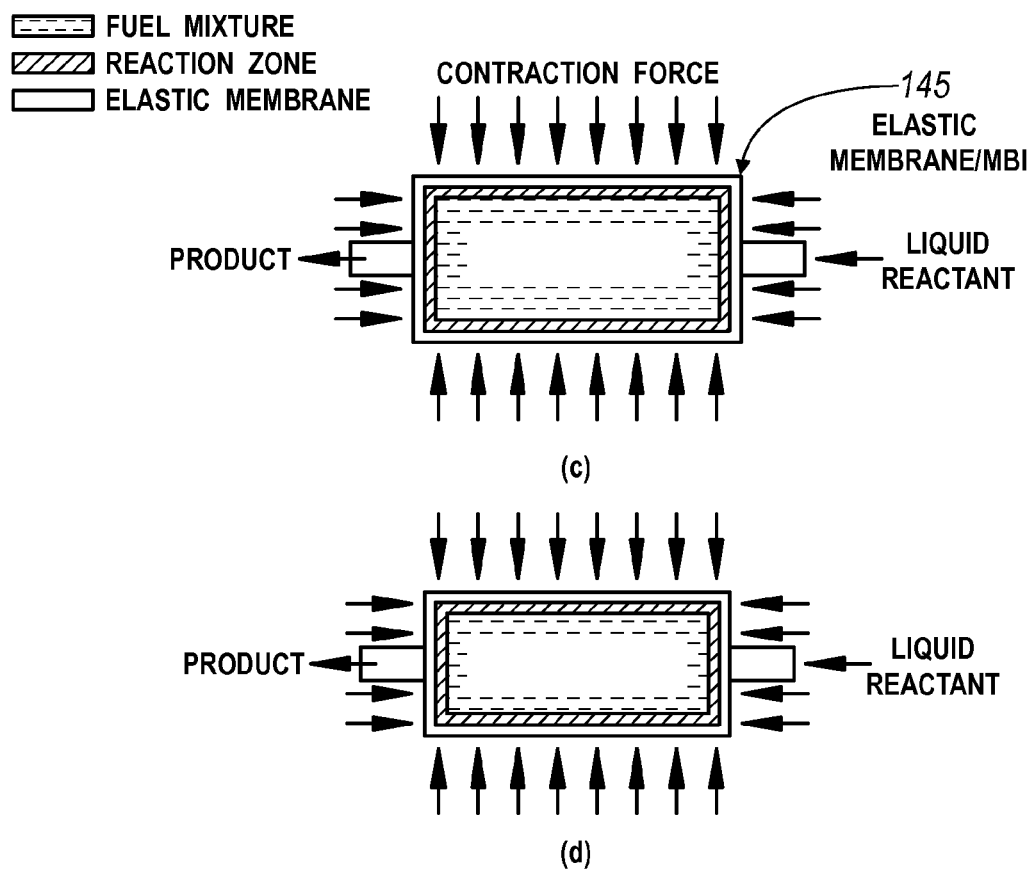

The fuel cell system 100 can additionally include a fuel interface 144 that couples the fuel 121 from the fuel source 120 to the fuel inlet of the fuel cells. As shown in FIGS. 4 and 7, this fuel interface 144 is preferably a fuel manifold including one or more fluidly sealed channels or tubes fluidly connecting the fuel source 120 to the fuel cell anodes, but can alternatively be a filter that filters fuel 121 from fuel generation waste, wherein the fuel 121 diffuses through the filter into the fuel manifold, an aspirator that vaporizes liquid fuel 121, or any suitable fuel interface. The fuel interface 144 can also include a catalyst that facilitates the generation of fuel 121 from the fuel storage composition. Fuel flow is preferably driven by fuel pressure within the fuel source 120. However, the fuel cell system 100 can additionally include a biasing mechanism 145 that biases the fuel 121 toward the fuel interface 144. In a first variation, the biasing mechanism 145 is a spring located on the fuel source 120 end opposite the reaction end (e.g. the end that is heated or reacted with reagent), wherein the fuel source is preferably a solid block of fuel storage composition. As shown in FIG. 5B, the biasing mechanism 145 can alternatively be an elastic bag enclosing the fuel storage composition (such as that described in U.S. application Ser. No. 12/908,845 filed 20 Oct. 2010, which is hereby incorporated in its entirety by this reference) or an elastic band through the length of the fuel storage composition. However, the biasing mechanism 145 can alternatively be a pump, a piston, a linear ratcheting mechanism, a fan, or any suitable biasing mechanism 145.

The fuel cell system 100 can additionally include a thermal regulation module 180 that functions to regulate the temperature of the fuel cell system 100. More preferably, the thermal regulation module 180 functions to maintain the fuel cell stacks and/or fuel storage composition within operation temperatures during fuel cell system operation, and can additionally function to cool the fuel cell stacks and/or fuel storage compositions under the operational temperatures and/or decomposition temperatures. The thermal regulation module 180 is preferably active (e.g. controlled by a processor, controlled by a thermal switch, etc.), but can alternatively be passively driven. The thermal regulation module 180 can additionally cool the system, wherein the rate of cooling can be increased in response to a stop condition, such as the removal of a load, exceeding of a temperature threshold, exceeding of a voltage threshold, or any other suitable stop condition.

In one variation, the thermal regulation module 180 includes a convection mechanism that introduces a cooling fluid into the system. The convection mechanism is preferably a fan, but can alternatively be any other suitable mechanism that facilitates fluid flow into the system. The cooling fluid is preferably ambient air, but can alternatively be a cooling liquid (e.g. water) or any other suitable cooling fluid. The thermal regulation module 180 preferably cools the fuel cell stacks by facilitating cooling fluid flow over the fuel cell stacks, but can alternatively cool the fuel cell stack by thermally coupling but fluidly isolating the fuel cell stack with the cooling fluid flow (e.g. through a manifold). For example, the thermal regulation module 180 includes a plurality of heat pipes running throughout the length of the PFCS 140 adjacent the fuel source 120, more preferably the same heat pipes used to pipe waste heat from the PFCS 140 to the fuel storage composition. The heat pipes preferably terminate in a heat sink that is exposed to the ambient air, or is cooled by a fan, preferably the same fan that provides air to the fuel cell stacks. Alternatively, the thermal regulation module 180 can be the process air manifold, wherein the cooling fluid is the oxygen-containing process air 106 that is fed into the fuel cell stack cathodes.

In another variation, the thermal regulation module 180 includes a thermoelectric generator that converts the heat to electricity, which is preferably absorbed by the battery. In this alternative, the thermoelectric generator(s) are preferably thermally insulated from the heated portions of the fuel cell system 100 until the external load is removed.

In another variation, a portion of the electricity produced is used to drive a Peltier cooling device, wherein the Peltier cooling device is preferably activated after the external load is removed.

In another variation, the thermal regulation module 180 includes an endothermic reaction, preferably substantially irreversible within the operational parameters of the fuel cell system 100, that preferably consumes the waste components of the fuel generation as reagents.

In another variation, the thermal regulation module 180 includes a heat storage mechanism that absorbs and stores heat from the system for future use (e.g. for heating up the SFCS or fuel storage composition in later operation), and/or functions to maintain the operational temperature for a prolonged period of time. In this variation, the heat storage mechanism is preferably a chemical composition, and is preferably a phase change material (e.g. a supersaturated solution of sodium acetate, wax, etc.), wherein heat release is preferably actively controlled (e.g. wherein mechanical agitation, such as the actuation of a push tab, causes the solution to saturate and release heat). However, the heat storage mechanism can alternatively be mechanical (e.g. heat is stored in the form of motion), and can be passively controlled (e.g. in the case of wax, wherein heat absorption and release are based on the temperature gradients between the heat storage mechanism and the fuel cell stack/fuel storage composition).

In another variation, the thermal regulation module 180 changes one or more thermal insulation properties of a container encapsulating the PFCS 140, SFCS 160, and/or fuel source 120. The thermal regulation module preferably reversibly removes the thermal insulation, but can alternatively permanently remove the thermal insulation. Thermal insulation removal can be achieved through physical decoupling of the thermal insulation from the fuel cell system. Alternatively, the thermal regulation module 180 can introduce a heat transfer medium into a previously thermally non-conductive space, such as a vacuum insulated wall of a container or a divider. This variation can also function as a thermal switch, wherein the state of the void space (evacuated or filled) can be controlled to heat or cool the system. For example, the heat transfer medium can be hydrogen gas, the thermal regulation module 180 can include a heater and a piece of metal hydride disposed within the vacuum insulated container wall distal the container interior. Heating of the metal hydride desorbs hydrogen into the container wall, rendering the container thermally conductive, and cooling of the metal hydride adsorbs hydrogen into the metal hydride (?), rendering the container thermally insulative. However, the thermal regulation module can reversibly thermally couple the thermally insulated system to the ambient environment in any other suitable manner.

In another variation, the thermal regulation module 180 moves a hot system component into contact with a cooler system component (e.g. an unreacted portion of the fuel storage composition, the ambient environment, etc.) to cool the hot component. In this variation, the thermal regulation module 180 is preferably a ratcheting mechanism coupled to the hot component, but can alternatively be a rotating mechanism coupled to the cold component or any suitable mechanism coupled to any suitable component that places a hot component in thermal contact with a cold component. In this variation, the mechanism is preferably controlled by a thermal switch, wherein the mechanism is activated when the temperature passes a predetermined threshold; however, the mechanism can be controlled by a processor, a timer, or by any other suitable control mechanism.

The fuel cell system 100 can additionally include an exhaust conditioning module that functions to cool the exhaust air from the fuel cell system 100. The exhaust air is preferably the air from the cathode of the fuel cells during steady state operation, but can also be the purge stream (from the anode of the fuel cells) during purging, the stream of cooling fluid, or any other suitable exhaust from the system 100. The exhaust conditioning module preferably includes the thermal interface 132, wherein the exhaust is preferably cooled by the fuel source 120 when the endothermic fuel generation reaction extracts heat from the exhaust. The exhaust conditioning module can additionally include the first thermal coupling mechanism, wherein secondary fuel cell stack exhaust is cooled by heat transfer to the cooler primary fuel cell stack. However, the exhaust conditioning module can include passing the hot exhaust through a Venturi device (e.g. Venturi tube or orifice plate), wherein the decrease in pressure of the exhaust air as the exhaust passes through the throat of the Venturi device can be used to draw in cooler air to mix with the hot exhaust, thereby cooling the exhaust. However, the exhaust conditioning module can pass the hot exhaust through a heat extraction/exchange device, wherein a heat pump (e.g. a Peltier element) pumps heat from the hot exhaust back into the fuel cell system 100, can utilize the cooling module 180 to cool the exhaust, or can include any other suitable means of cooling the hot exhaust air from the fuel cell stacks.

The fuel cell system 100 can additionally include a processor 170 that functions to control fuel cell startup, fuel cell maintenance (e.g. purging), and fuel cell cool down. The processor can additionally control fuel generation. Alternatively, the processor 170 can only control fuel cell maintenance, wherein startup and cool down are passive, and occur through mechanical mechanisms that are activated when the external load is coupled and decoupled from the fuel cell system 100, respectively. The processor 170 can additionally be coupled to a plurality of sensors that determine whether a purge is needed, and processes the information to adjust the battery load as needed. For example, the processor 170 can be coupled to a voltage sensor in the last fuel cell in a series of fuel cells, wherein the processor 170 decreases the load on the fuel cell stack, purging the stack, upon detection of a low voltage reading. The processor 170 is preferably a CPU, but can be any suitable processing component.

The fuel cell system 100 preferably additionally includes a casing no (container) that functions to mechanically protect and retain the heating module 150 and the primary fuel cell stack 140. The casing no can additionally mechanically protect and retain the fuel source 120. The casing no can additionally thermally insulate the fuel cell system 100. In one variation, the casing includes a vacuum-insulated base and vacuum-insulated walls. The casing 110 is preferably constructed of a material that is corrosion resistant, liquid impermeable, and heat resistant, such that waste components will not leak through the casing 110. Additionally, the casing no is preferably substantially fluidly sealed such that non-fuel reaction components do not leak through. The casing no is preferably rigid, but can alternatively be semi-rigid, flexible, or a combination of rigidities, and is preferably durable, such that the casing interior can be pressurized. The casing no can be made of plastics (e.g., Polyethylene, PEEK, polypropylene), metals (e.g., stainless steel, Aluminum), ceramics (e.g., silicon carbide, kaolinite, glass), or a combination of the aforementioned materials (e.g., metal lined plastic). The casing no is preferably small enough to be inserted into a laptop or a cell phone, but can alternatively be any size, such as that of a car battery or even larger. The casing 110 is preferably in the form of a prism (with or without rounded edges and corners), but can alternatively be a cylinder, a sphere, or a container of any shape and size. The casing 110 is preferably formed from two pieces that are welded together, but can alternatively be milled from a single piece, sintered from powder, several pieces or one piece welded together, two pieces that are mechanically joined (e.g., by using screws, clasps, hooks, or other joining mechanisms) or multiple pieces that are glued together. The casing no preferably includes inlets, outlets, or valves fluidly connecting the inside of the container to the outside for the purposes of adding more reactants, transferring fuel 121 to a fuel cell, releasing built up pressure, or for any other purpose wherein materials need to be introduced or removed from the interior of the casing no. More preferably, the casing no includes a valve coupled to the primary and secondary fuel cell stacks that allow waste purging to the environment. The casing no preferably additionally includes an electrical outlet, coupled on the interior to the electrical outlet of the battery and/or the primary and/or secondary fuel cell stacks.

In one variation, as shown in FIG. 7, the casing 110 includes a cap that removably seals a portion of the casing 110, such as a casing end. The cap is preferably removably coupled to the casing by a set of complimentary threads, a set of complimentary magnets, a set of complimentary clips, bolts, screws, adhesive, or any other suitable transient coupling mechanism. The cap and casing preferably cooperatively define a thermally insulated volume enclosing the PFCS 140 and SFCS 156, and can additionally enclose the fuel source 120. The cap preferably thermally isolates the system components that require lower temperatures to operate, such as the battery and processor 170, on the exterior of the fuel cell system. The cap can additionally support a portion of the thermal regulation mechanism 180, such as a fan, cooling block, vents, or process air intake 107. The fuel cell stacks are preferably statically coupled to the cap (e.g. mounted by bolts, screws, adhesive, welds, etc.), such that the fuel cell stacks are removed from the casing 110 when the cap is removed, but can alternatively be statically or removably coupled to any other suitable portion of the casing. However, any other suitable casing configuration can be used.

3. Method.

Figure 8:
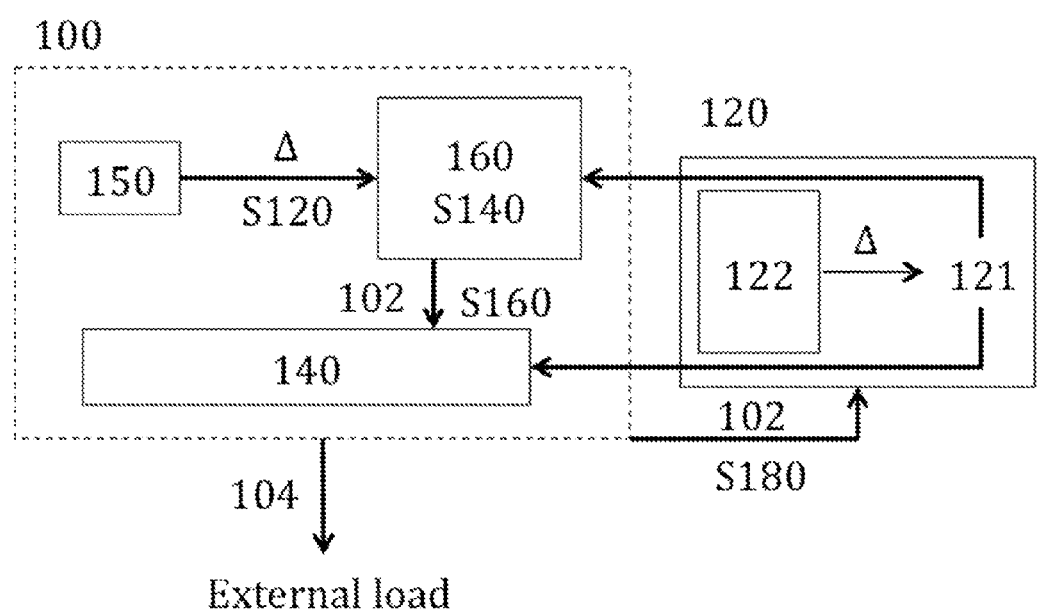
FIG. 8 is a schematic representation of a method of using a high temperature fuel cell system.

As shown in FIG. 8, the method of operating a high temperature fuel cell system includes: heating the secondary fuel cell stack with the heating mechanism S120, converting fuel to electricity and starter heat with the secondary fuel cell stack S140, heating the primary fuel cell stack with a fuel conversion product S160; and producing fuel with a fuel conversion product S180. The fuel conversion product can be the electricity, the starter heat, or both. The method is preferably initiated in response to the coupling of an external load to the fuel cell system, and functions to provide electricity to the external load. Producing fuel S180 preferably includes thermolysing a fuel storage composition to produce fuel, which is subsequently fed into the fuel inlet of the fuel cell stack(s). Producing fuel S180 can include producing fuel using the heat generated by the fuel cell stack(s), which can include flowing a waste heat fluid stream from the fuel cell stack over an endothermic fuel source, or thermally coupling a waste heat fluid stream from the fuel cell stack to the endothermic fuel source, wherein the waste heat fluid stream can include exhaust from the fuel cell stack anode, exhaust from the fuel cell stack cathode, or heated cooling fluid. Producing fuel S180 can also include producing fuel using waste heat generated by an exothermic fuel generation reaction, which can include flowing fuel from the exothermic fuel generation reaction over an endothermic fuel source. Fuel can additionally be generated through electric heating, such as resistive battery heating wherein the battery provides energy to heat a fuel storage composition to generate fuel.

In steady state, the fuel cell system preferably functions without additional energy input from the battery, wherein the heat generated from fuel conversion to electricity is preferably enough to both generate fuel (e.g. though thermolysis) and to keep the fuel cell stack(s) at operational temperature.

In the cooling state, fuel production and fuel conversion to electricity is preferably slowed and eventually halted. This state is preferably activated upon removal of an external load. The method of operating the fuel cell system can additionally include halting heat provision to the fuel source, wherein the endothermic nature of the fuel conversion reaction preferably lowers the fuel storage composition temperature below the thermolytic threshold, effectively quenching fuel generation. Halting heat provision to the fuel source can include ceasing electric heating, redirecting the waste heat fluid stream (e.g. such that the stream vents to the exterior), or any other suitable manner of halting heat provision. Alternatively, the method of operating the fuel cell system can include activating the cooling module to cool the fuel cell stacks and/or the fuel source (e.g. increasing the speed of a fan), changing the thermal insulation of a container, or otherwise cooling the fuel cell stacks and/or fuel source. The method of operating the fuel cell system can additionally include converting excess fuel into electricity by the fuel cell stacks and storing the excess energy within the battery, or leaving the excess fuel in the container as pressurized fuel. The latter case can be preferable if a faster startup time is desired, as fuel does not have to be generated prior to startup.

As a person skilled in the art will recognize from the previous detailed description and from the figures and claims, modifications and changes can be made to the preferred variations of the invention without departing from the scope of this invention defined in the following claims.

We claim:
1. A fuel cell system comprising:
    a fuel cell stack comprising:
        a primary fuel cell sub-assembly having a first thermal mass;
        a secondary fuel cell sub-assembly having a second thermal mass smaller than the first thermal mass;
    a fuel generator;
    a first thermal coupling mechanism thermally coupling waste heat from the secondary fuel cell sub-assembly to the primary fuel cell sub-assembly;
    a second thermal coupling mechanism thermally coupling waste heat from the fuel cell stack to the fuel generator;
    a thermally insulated casing defining a thermally insulated volume encapsulating the fuel cell stack, fuel generator, first thermal coupling mechanism, and second thermal coupling mechanism, the thermally insulating casing further comprising a cap removably sealing an end of the casing, the cap and casing cooperatively defining the thermally insulated volume, the cap further comprising a processing unit and a process air intake, wherein the fuel cell stack is mounted to the cap.

2. The system of claim 1, wherein the first thermal coupling mechanism comprises the thermally insulated volume.

3. The system of claim 1, wherein the second thermal coupling mechanism comprises a thermally conductive, fluid impermeable divider between the fuel generator and the fuel cell stack, the divider further comprising a fuel manifold fluidly connecting the fuel generator and the fuel cell stack.

4. The system of claim 1, wherein the second thermal coupling mechanism comprises an exhaust fuel path of the fuel cell stack, thermally coupled to and fluidly isolated from the fuel generator, wherein the second thermal coupling mechanism extends between the fuel generator and casing.

* * * * *